United States Patent
Giardino et al.

(10) Patent No.: US 10,699,380 B2
(45) Date of Patent: Jun. 30, 2020

(54) METHOD/DEVICE FOR ROTATING AN IMAGE AND PRINTING METHOD/SYSTEM COMPRISING SAID METHOD/DEVICE FOR ROTATING

(71) Applicant: SYSTEM S.P.A., Fiorano Modenese (Modena) (IT)

(72) Inventors: Simone Giardino, Valsamoggia (IT); Federico Cavallini, Modena (IT); Franco Stefani, Sassuolo (IT); Matteo Rubbiani, Sassuolo (IT); Giuliano Pistoni, Baiso (IT)

(73) Assignee: SYSTEM S.P.A., Fiorano Modenese (IT)

( * ) Notice: Subject to any disclaimer, the term of this patent is extended or adjusted under 35 U.S.C. 154(b) by 38 days.

(21) Appl. No.: 16/078,587

(22) PCT Filed: Mar. 3, 2017

(86) PCT No.: PCT/IB2017/051257
§ 371 (c)(1),
(2) Date: Aug. 21, 2018

(87) PCT Pub. No.: WO2017/149509
PCT Pub. Date: Sep. 8, 2017

(65) Prior Publication Data
US 2019/0066267 A1    Feb. 28, 2019

(30) Foreign Application Priority Data

Mar. 4, 2016   (IT) .................... 102016000022779

(51) Int. Cl.
*G06T 3/60* (2006.01)
*G06F 3/12* (2006.01)

(52) U.S. Cl.
CPC ............ *G06T 3/606* (2013.01); *G06F 3/1208* (2013.01); *G06F 3/1244* (2013.01);
(Continued)

(58) Field of Classification Search
CPC ......... G06T 3/60; G06T 3/606; G06F 3/1208; G06F 3/1237
See application file for complete search history.

(56) References Cited

U.S. PATENT DOCUMENTS 5,204,944 A    4/1993  Wolberg et al.
5,606,534 A    2/1997  Stringer et al.
(Continued)

FOREIGN PATENT DOCUMENTS

EP    0 269 287 A2    6/1988
EP    2 026 249 A1    2/2009
(Continued)

OTHER PUBLICATIONS

International Preliminary Report on Patentability for International Application No. PCT/IB2017/051256 filed Mar. 3, 2017 on behalf of System S.P.A., dated Sep. 4, 2018. 8 pages.
(Continued)

*Primary Examiner* — Michelle L Sams
(74) *Attorney, Agent, or Firm* — Steinfl + Bruno LLP

(57) ABSTRACT

A method for rotating a digital image in order to print a corresponding rotated print image. The method includes i) providing the digital image to be printed on the printing substrate; ii) receiving positioning coordinates of the substrate relative to a first predefined reference; and iii) rotating the image relative to its centre as a function of the positioning coordinates, thus determining a rotated image. According to one aspect, the rotation is performed by means of a
(Continued)

technique of mapping between pixels of the rotated image and pixels of the digital image, and calculating a matrix of correspondences between the pixels of the rotated image and the pixels of the digital image. According to another aspect, the matrix is configured to indicate how many pixels of the rotated image correspond to pixels of the digital image.

21 Claims, 9 Drawing Sheets

(52) U.S. Cl.
CPC .......... *G06F 3/1245* (2013.01); *G06F 3/1282* (2013.01); *G06T 3/60* (2013.01); *G06T 2207/30108* (2013.01)

(56) References Cited

U.S. PATENT DOCUMENTS

| | | |
|---|---|---|
| 2002/0149805 A1 | 10/2002 | Tanaka et al. |
| 2009/0039157 A1 | 2/2009 | Reichenbach et al. |
| 2013/0208290 A1 | 8/2013 | Ikari |
| 2014/0320868 A1* | 10/2014 | Shaked .................. B41J 11/008 358/1.2 |
| 2016/0378042 A1 | 12/2016 | Tanaka et al. |
| 2019/0051012 A1 | 2/2019 | Giardino et al. |

FOREIGN PATENT DOCUMENTS

| | | |
|---|---|---|
| JP | 2007-041990 A | 2/2007 |
| WO | 2017/149508 A1 | 9/2017 |

OTHER PUBLICATIONS

Non-Final Office Action for U.S. Appl. No. 16/078,519, filed Aug. 21, 2018 on behalf of System SPA, dated Apr. 24, 2019. 20 pages.
Notice of Allowance for U.S. Appl. No. 16/078,519, filed Aug. 21, 2018 on behalf of System SPA, dated Oct. 22, 2019. 10 pages.
Wallis, J.W., et al. "An Optimal Rotator for Iterative Reconstruction." *IEEE Transactions on Medical Imaging* vol. 16 (1), 118-123, (Feb. 1997). 6 pages.
Wolberg, G. "Digital Image Warping—Ch. 3 Spatial Transformations & Ch. 5 Image Resampling", pp. 41-94, 117-161. Wiley—IEEE Computer Society Press. Aug. 1990. 99 pages.
International Search Report for International Application No. PCT/IB2017/051256 filed Mar. 3, 2017 on behalf of System S.p.A., dated Jun. 8, 2017. 3 pages.
Written Opinion for International Application No. PCT/162017/051256 filed Mar. 3, 2017 on behalf of System S.p.A., dated Jun. 8, 2017. 7 pages.
International Search Report for International Application No. PCT/IB2017/051257 filed Mar. 3, 2017 on behalf of System S.p.A., dated Jun. 26, 2017. 4 pages.
Written Opinion for International Application No. PCT/IB2017/051257 filed Mar. 3, 2017 on behalf of System S.p.A., dated Jun. 26, 2017. 6 pages.

* cited by examiner

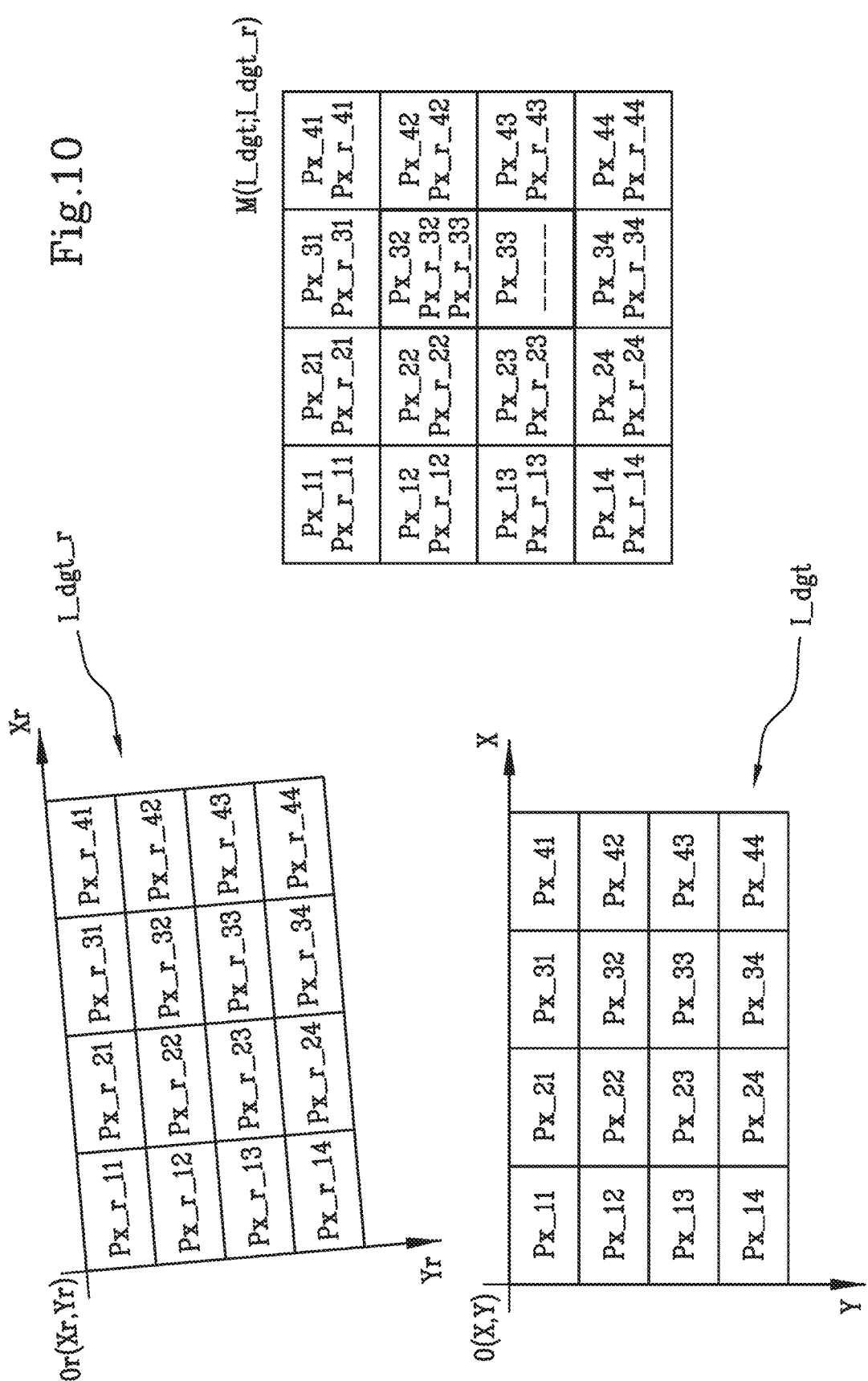

METHOD/DEVICE FOR ROTATING AN IMAGE AND PRINTING METHOD/SYSTEM COMPRISING SAID METHOD/DEVICE FOR ROTATING

CROSS REFERENCE TO RELATED APPLICATIONS

The present application is the U.S. national stage of International Patent Application PCT/IB2017/051257 filed internationally on Mar. 3, 2017, which, in turn, claims priority to Italian Patent Application No. 102016000022779 filed on Mar. 4, 2016.

FIELD OF APPLICATION

The present invention relates to a method for rotating an image and a corresponding device for rotating an image.

The present invention further relates to a method for printing an image comprising the aforesaid method for rotating, and a system for printing an image comprising the aforesaid device for rotating an image.

The invention makes reference to a rotation of images for printing on printing media such as, in particular, tiles and the description that follows makes reference to this field of application.

PRIOR ART

There are known systems for printing on tiles, for example in a glazing line, which have considerable linear dimensions, reaching as much as 20 metres.

Such systems require that all the operations tied to preparing the tiles and printing, including arranging and positioning the tiles and maintaining them in position, subsequent printing, drying of the inks after printing etc., take place in sequence in the same system.

Systems of this size are inevitably scarcely flexible and suffer from multiple problems; for example, a failure in a single station of the system will block all production, long durations of one phase of the system (for example, a drying phase) will slow down the whole printing process, incorrect positioning of the tiles, which compromises their integrity, causing cracks or chipping, can determine, at the end of the process, printed materials to be rejected.

It is evident that the multiple vulnerabilities of the system, as presently conceived, result in a potential serious inefficiency of the same.

In particular, the step of arranging the tiles on a conveyor surface for subsequent printing is particularly delicate.

Since in the rigid systems of the prior art printing always takes place at the same point in the system, the tiles must be positioned precisely in order to receive a print on them. Special centring systems ensure that the tiles, once arranged on a moving belt, are oriented in such a way as to arrive at the printing station with the right orientation; in particular, these tiles are infed to the system on the belt and made to slide between guides that maintain their orientation. The belt must necessarily be aligned with the print heads to prevent this from taking place according to an incorrect orientation.

By their very nature, tiles are delicate and brittle and easily subject to chipping if they come into contact with one another during an orientation step; this determines, on the one hand, a potentially high percentage of rejects, and on the other hand a substantial loss of efficiency due to the length of time that tiles that will not be destined for sale because damaged remain nonetheless in the system.

It is therefore crucial, in a system for printing on tiles, once the initial positioning of the tiles has been determined, to ensure that the positioning can be correct, in particular so as to render the printing operation more efficient.

The object of the present invention is to provide a method and a device for rotating an image, in particular a printing substrate, which may contribute to solving the aforesaid problems by overcoming the drawbacks of the prior art.

A further object of the present invention is to provide a method and a system for printing on a printing substrate, in particular a tile, which may contribute to solving the aforesaid problems by overcoming the drawbacks of the prior art.

A specific object is to provide a method/device for rotating an image, in particular a printing substrate, prepared in a printing method/system, which may contribute to solving the aforesaid problems by overcoming the drawbacks of the prior art.

SUMMARY OF THE INVENTION

In a first aspect, the invention comprises a computer-implemented method for rotating a digital image in order to print a corresponding rotated print image on at least one printing substrate, wherein the method comprises the steps of:
providing the digital image to be printed on the at least one printing substrate;
receiving positioning coordinates of the printing substrate relative to a first predefined reference;
rotating the image relative to its centre as a function of the positioning coordinates, thus determining a rotated image;
wherein the rotation is performed by means of a technique of mapping between pixels of the rotated image and pixels of the digital image;
calculating a matrix of correspondences between the pixels of the rotated image and the pixels of the digital image, wherein the matrix is configured to indicate how many pixels of the rotated image correspond to pixels of the digital image;
performing a post-processing comprising the steps of:
    detecting, from the matrix of correspondences, the pixels of the digital image that have no correspondence with the pixels of the rotated image;
    detecting the multiple pixels in the rotated image;
    remapping the pixels with no correspondence in the digital image into respective pixels with multiple correspondences in the rotated image;
wherein the remapping step determines the rotated digital print image having a preserved distribution of pixels relative to the digital image. Preferably, the step of remapping the pixels with no correspondence in the digital image into respective pixels with multiple correspondences in the rotated image comprises the steps of:
    detecting, among the pixels near the pixels with no correspondence in the digital image, whether there exists a pixel having a multiple correspondence with pixels of the rotated image;
    whether there exists a pixel in the digital image having a multiple correspondence with pixels of the rotated image, and copying, in one of the pixels having a multiple correspondence, the identifier of the pixel of the digital image that has no correspondence with the pixel of the rotated image.
Preferably, the step of copying, in one of the pixels having a multiple correspondence, the identifier of the pixel of the digital image that has no correspondence with the pixel of the rotated image comprises the steps of: if, in the original image, the pixel to be remapped, with zero correspondences, is nearer to/farther from the origin O (X,Y) relative to the one mapped twice, copying, in the pixels nearer to/farther from the rotated origin O (Xr;Yr), the pixels of the digital image to be remapped.

Preferably, the technique of mapping between pixels of the rotated image and pixels of the digital image is a backward mapping technique in which, starting from the rotated image, one obtains the digital image by rotating the rotated image relative to the centre of the rotated image itself.

Preferably, the step of detecting, among the pixels near the pixel with no correspondence in the digital image, whether there exists a pixel having a multiple correspondence with pixels of the rotated image, is performed by means of a nearest neighbour technique.

Preferably, the step of rotating the image relative to its centre comprises the steps of:
- applying a first translation consisting in translating the image in such a way that the centre of the image coincides with the origin of a reference rotation system;
- rotating the image relative to its centre;
- applying a second translation by translating the rotated image in such a way that the pixel at the top right coincides with the origin of the reference rotation system.

In a second aspect, the invention comprises a device for rotating a digital image for printing a corresponding rotated print image on at least one printing substrate, comprising a processing unit comprising:
a first receiver module configured to receive a digital image to be printed on the at least one printing substrate;
a second receiver module configured to receive positioning coordinates of the printing substrate relative to a first predefined reference;
wherein the processing unit further comprises a rotation unit comprising:
- a rotation module configured to digitally rotate the image relative to its centre as a function of the positioning coordinates, thus determining a rotated image, wherein the rotation is performed by means of a technique of mapping between pixels of the rotated image and pixels of the digital image;
- a first calculation module configured to calculate a matrix of correspondences between the pixels of the rotated image and the pixels of the digital image, wherein the matrix is configured to indicate how many pixels of the rotated image correspond to pixels of the digital image;
- a second calculation module configured to:
- detect, from the matrix of correspondences, the pixels of the digital image that have no correspondence with the pixels of the rotated image;
- detect the multiple pixels in the rotated image;
- remap the pixels with no correspondence in the digital image in respective pixels with multiple correspondences in the rotated image;
wherein the remapping step determines the rotated digital print image having a preserved distribution of pixels relative to the digital image.

Preferably, the second calculation module, in the step of remapping the pixels with no correspondence in the digital image in respective pixels with multiple correspondences in the rotated image, is configured to:
detect, among the pixels near the pixel with no correspondence in the digital image, whether there exists a pixel having a multiple correspondence with pixels of the rotated image;
whether there exists a pixel in the digital image having a multiple correspondence with pixels of the rotated image, and copy, in one of the pixels having a multiple correspondence, the identifier of the pixel of the digital image that has no correspondence with the pixel of the rotated image.

Preferably, the second calculation module, in the step of copying, in one of the pixels having a multiple correspondence, the identifier of the pixel of the digital image that has no correspondence with the pixel of the rotated image, is configured to perform the step of: if, in the original image, the pixel to be remapped, with zero correspondences, is nearer to/farther from the origin O (X,Y) relative to the one mapped twice, copying, in the pixel nearer to/farther from the rotated origin O(Xr;Yr), the pixel of the digital image to be remapped.

In a third aspect, the invention describes a method of digital printing on printing substrates comprising the steps of:
providing at least one printing substrate;
providing a digital image to be printed on the at least one printing substrate;
providing a printing apparatus comprising at least one printing support bar which supports a plurality of print heads, configured to print the digital image on the at least one printing substrate;
feeding, with a random orientation, the at least one printing substrate to the printing apparatus on a conveyor surface, at a selectable speed and in a predefined direction;
locating the at least one printing substrate infed to the printing apparatus on the conveyor surface, thereby determining coordinates for locating the printing substrate relative to a first predefined reference;
rotating the digital image as a function of the positioning coordinates of the printing substrate, thereby determining a rotated digital print image for the printing substrate; preferably the rotation is performed according to the method described in the first aspect of the invention.
printing the rotated print image on the printing substrate, maintaining the orientation of the printing medium unchanged relative to a second predefined reference, wherein the printing operation is performed by the plurality of print heads.

Preferably, there is envisaged a step of aligning the first predefined reference with the second predefined reference;

Preferably, in the step of locating the at least one printing substrate, the first predefined reference is the reference system of the second acquisition means.

Preferably, the second predefined reference is one between:
the reference system of a printing support bar;
the reference system of a plurality of printing support bars.

Preferably, the aligning step comprises:
feeding a printing substrate towards the printing apparatus, and printing a first pattern on the printing substrate;
again feeding the printing substrate towards the printing apparatus, locating the first pattern on the printing substrate and printing a second pattern on the printing substrate;
again feeding the printing substrate towards the printing apparatus, locating the first pattern on the printing substrate and printing a second pattern on the printing substrate;
determining a matrix of roto-translation between the two patterns, thereby determining a matrix of roto-translation between the first reference and the second reference.

In a fourth aspect, the invention discloses a computer-implemented method comprising one or more of the steps of the method described in the third aspect of the invention.

In a fifth aspect, the invention describes a system for digital printing on printing substrates comprising
an insertion interface configured to receive a digital image to be printed on at least one printing substrate;
a conveyor surface configured to convey a printing substrate with a random orientation towards a printing apparatus at a selectable speed and in a predefined direction;
the printing apparatus comprising at least one printing support bar which supports a plurality of print heads configured to print the digital image on the at least one printing substrate;
a locating device, positioned on the infeed side of the apparatus, and configured to locate the at least one printing substrate moving with a random orientation on the conveyor surface, thereby determining location coordinates of the printing substrate relative to a first predefined reference; a processing unit, in data connection with the printing apparatus and with the locating device, comprising:
   a rotation module configured to rotate the digital image as a function of the positioning coordinates of the printing substrate, thereby determining a rotated digital print image for the printing substrate; preferably, the rotation is carried out by means of the device described in the second aspect of the invention.

The plurality of print heads is configured to print the digital image on the at least one printing substrate.

Preferably, the processing unit comprises an alignment module configured to align the first predefined reference with the second predefined reference.

Preferably, the first predefined reference is the reference system of the second acquisition means.

Preferably, the second predefined reference is one between:
   the reference system of a printing support bar;
   the reference system of a plurality of printing support bars.

Providing, in accordance with the invention, a precise location of a printing substrate enables precise, reliable processing of the data related to the printing substrate.

Providing, in accordance with the invention, a precise rotation of an image for a printing substrate enables precise, reliable processing of the data related to the printing substrate and to the image itself.

Providing, in accordance with the invention, a precise rotation of images for printing substrates which ensures a precise positioning of images to be printed on the printing substrates, in particular a positioning on the printing substrates at the entry of a printing apparatus, enables the subsequent control and printing steps to be optimised, thus ensuring a more efficient and flexible printing system/method.

In particular, the invention, as described, achieves the following technical effects, as compared to the prior art:
   precise and reliable processing of the data related to the printing substrate and to the image itself due to the precise rotation of the image; in other words, given the high reliability of the image rotation process, the image can be intended for very complex printing requiring high precision.
   less risk of damaging the printing substrates due to the lack of any need to rotate them mechanically in order to correct their orientation;
   less risk of damaging the printing substrates because no passage between guides is necessary to maintain the orientation of the substrates, nor is there any contact with guides;
   lack of any need to have incoming substrates oriented in an optimal manner, which makes it possible to considerably reduce the time of providing the printing substrates and printing times;
   separability of the stations making up the system, which ensures the possibility of having several stations of the system work in parallel or remotely, with the following advantages:
      possibility of using stations made by different manufacturers in a same system, thus enabling a synchronisation thereof and making the structuring of the system as "modular" as possible;
      production efficiency, by virtue of the fact that production times are no longer dependent on the sum of the times of stations arranged in series in the system and separable neither physically, nor in terms of sequential timing;
      more efficient maintenance, by virtue of the fact that one station can undergo inspection without blocking the others;
      a better reaction to malfunctions, by virtue of the fact that a malfunction in one station will not block the entire system, as the station can be momentarily replaced by another similar one.

The aforementioned technical effects/advantages and other technical effects/advantages of the invention will emerge in further detail from the description provided herein below of an example embodiment provided by way of approximate and non-limiting example with reference to the attached drawings.

BRIEF DESCRIPTION OF THE DRAWINGS

FIG. 10 describes details of the device/method of FIG. 9.

DETAILED DESCRIPTION

The present invention relates to a method and device for rotating an image for a printing substrate, in particular in order to provide a method and system for digital printing on printing substrates, be they rigid or flexible.

In a preferred embodiment, described below, the printing substrates comprise ceramic substrates, particularly tiles.

Printing on ceramics is used both to create a coloured motif, with decorative inks, and to translate "material" effects into reality with material inks.

Figure 1:
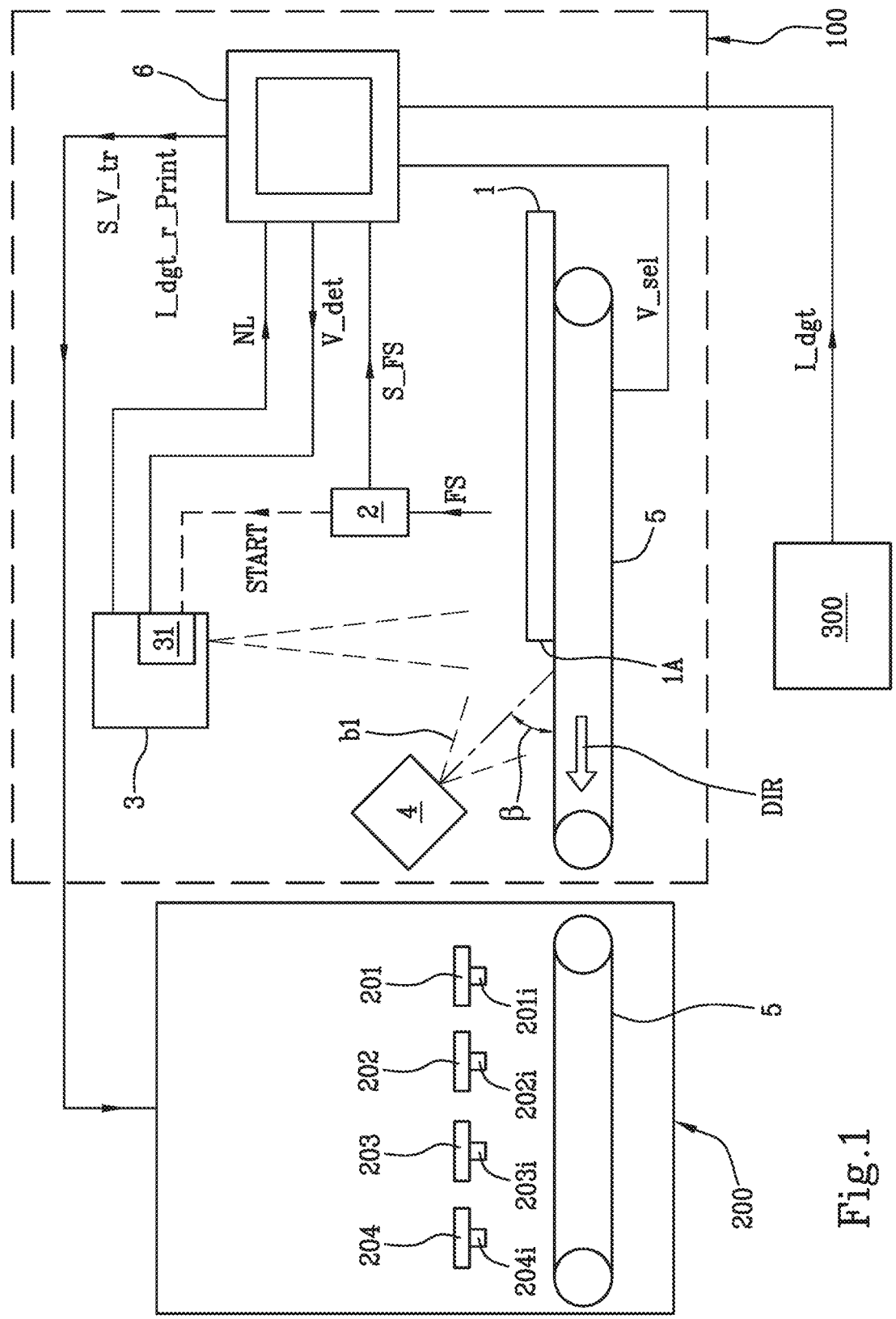
FIG. 1 is a schematic view of a device for locating a printing substrate according to the invention.

With reference to FIG. 1, it shows a locating device 100 for locating the aforesaid printing substrate 1, wherein the substrate is moving on a conveyor surface 5 at a selectable speed V_sel and in a feed direction Dir. The locating device 100 further comprises an illumination means 4 for illuminating the printing substrate 1, configured to emit a light beam b1 incident on the conveyor surface 5 according to a predetermined angle β. Preferably, the predetermined angle β is an angle comprised between 25° and 50°, more preferably between 30° and 45°.

In one embodiment of the invention, the angle of incidence is 90°: this in the case of a machine for printing on reflective media such as, for example, sheets of glass.

In a preferred embodiment of the invention, the illumination means 4 comprises a LED-type illuminator, preferably with a concentric cylindrical lens.

The light beam b1 generated appears as a linear stripe, orthogonal to the feed direction Dir.

The technical effect achieved is an illumination of the visual field of the camera during the acquisition of the printing substrate 1. The position of the illuminator and the particular angle present between the light beam b1 and the conveyor surface 5 are selected so as to maximise the illumination of the surface of the printing substrate 1 and minimise the illumination of the conveyor surface 5.

The device further comprises acquisition means 2,3 configured to acquire a predetermined plurality of lines NL of the printing substrate 1 in movement, as a function of a line frequency FL which is defined in turn as a function of an acquisition rate V_det.

In a preferred embodiment of the invention, the line frequency FL is proportional to the acquisition rate V_det.

In other words, the acquisition means 2,3 provide a single two-dimensional image I_PR formed by the concatenation of the predetermined number NL of lines acquired at a line frequency FL determined as a function of the acquisition rate V_det.

Preferably, the acquisition of the primary image I_PR of the printing substrate 1 takes place as a function of a Start acquisition activation signal.

From an analysis of the primary image I_PR, the invention derives the profile of the edges, represented by points Pi described below, and from the profile of the edges it derives the vertex point and angles of the substrate 1.

In a preferred embodiment of the invention, the acquisition means 2,3 comprise a first acquisition means 2, in particular a high-precision photocell.

According to the invention, the first acquisition means 2 is configured to detect a front 1A of the printing substrate 1 advancing on the conveyor surface 5 in the feed direction Dir.

Furthermore, the first acquisition means 2 is configured to generate the Start activation signal as a function of the detection that has taken place. In a preferred embodiment of the invention, the acquisition means 2,3 further comprise a second acquisition means 3, in particular a high-resolution camera.

Preferably, the camera has a fixed-focus lens set on the plane of the printing substrate 1, usually at a distance of from 0.5 to 1.4 mm from the rest surface; a good depth of field of the lens ensures that the focus is acceptable under any conditions.

Preferably, the camera is placed orthogonally to the direction of motion Dir so as to be able to reconstruct an image by successive scans.

The second acquisition means 3 is configured to acquire a predetermined plurality of lines NL of the printing substrate 1.

With reference to FIG. 1, the acquisition means 3 preferably comprises an activation module 31 configured to activate the acquisition.

According to the invention, the first acquisition means 2 is further configured to send the Start activation signal to the activation module 31 based on the detection of the front 1A.

The activation module 31 is configured to remain always on standby for a new Start activation signal.

Figure 2:
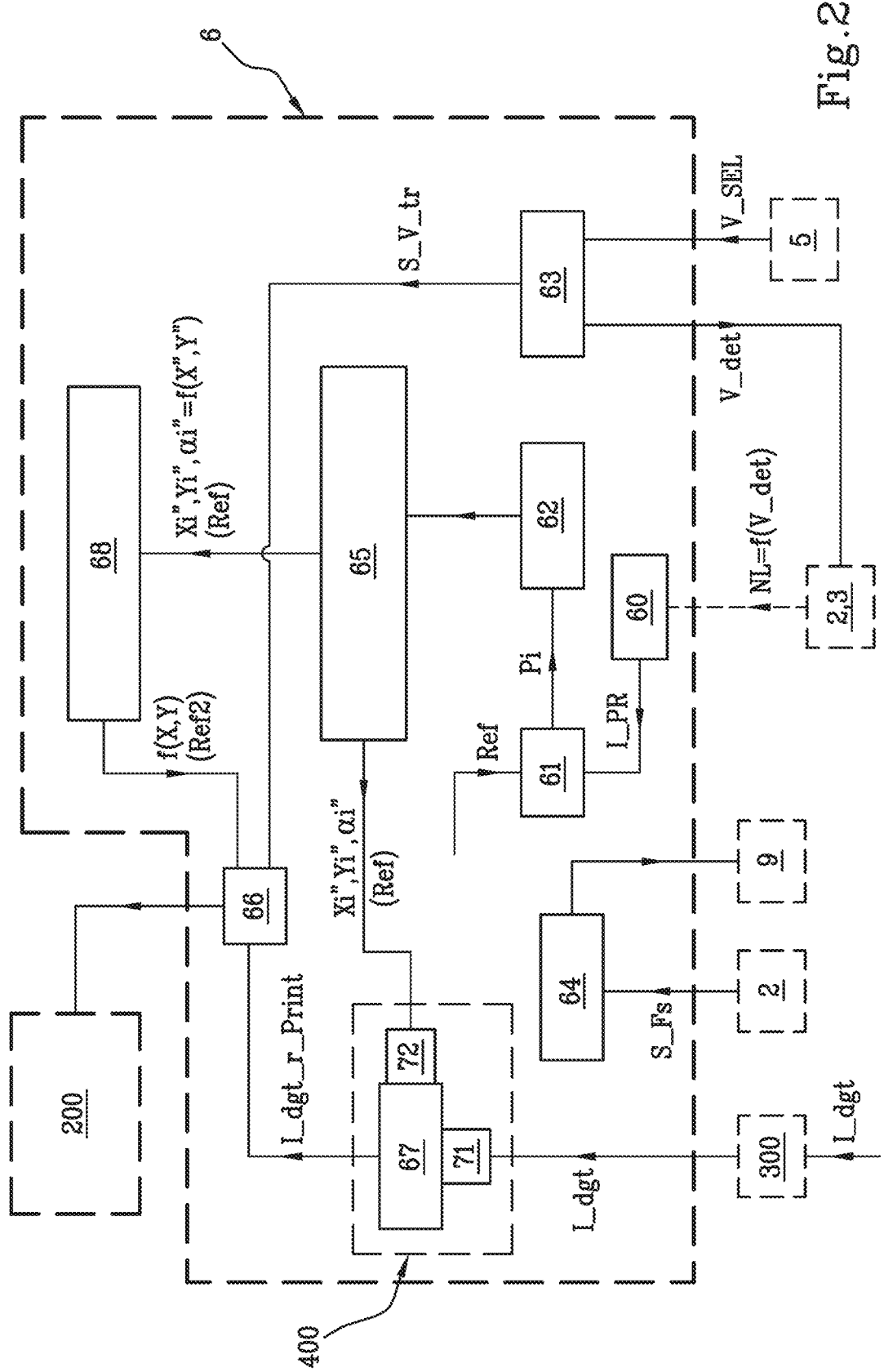
FIG. 2 is a block diagram of a specific unit of the device shown in FIG. 1.

With particular reference to FIG. 2, the invention comprises a processing unit 6 in data connection at least with the acquisition means 2,3.

In particular, the processing unit 6 is connected to the acquisition means via a high-speed connection.

In general, it should be noted that in the present context and in the subsequent claims, the processing unit 6 is presented as being split into distinct functional modules (storage modules and operative modules) for the sole purpose of describing its functionalities clearly and completely.

In actual fact, this processing unit 6 can comprise a single electronic device, appropriately programmed to perform the functionalities described, and the different modules can correspond to hardware entities and/or routine software that are part of the programmed device.

Alternatively, or in addition, such functions may be performed by a plurality of electronic devices over which the aforesaid functional modules can be distributed.

The processing unit 6 can also make use of one or more processors for executing the instructions contained in the storage modules.

The aforementioned functional modules can also be distributed over different local or remote computers, depending on the architecture of the network in which they reside.

The processing unit 6 is configured to process data representative of the position and conformation of printing substrates based on the predetermined plurality of lines NL acquired by the acquisition means 2,3. The processing unit 6 will be described in detail with reference to FIG. 2. The processing unit 6 comprises a receiver module 60 configured to receive the predetermined plurality of lines NL acquired by the acquisition means 2,3.

According to the invention, the processing unit 6 comprises a generation module 61 configured to generate a primary image I_PR as a function of the acquired predetermined plurality of lines NL.

According to the invention, the processing unit 6 comprises a detection module 62, in data connection with the generation module 61, and configured to detect, from the generated primary image I_PR, a plurality of points Pi representative of the printing substrate 1, wherein the coordinates of the plurality of points Pi are expressed in relation to a first predefined reference Ref.

The processing unit 6 further comprises a first processing module 63 configured to receive, as input, the selectable speed V_sel, calculate a rate of acquisition V_det of the predetermined plurality of lines NL and send the acquisition rate V_det to the acquisition means 2,3 (FIGS. 1 and 2). According to the invention, the first processing module 63 is configured to calculate the rate of acquisition V_det of the predetermined plurality of lines NL as a function of the selectable speed V_sel.

In other words, V_det=f (V_Sel).

In a preferred embodiment of the invention, V_det=V_Sel.

Based on what is computed by the first processing module 63, the generation module 61 is configured to generate the primary image I_PR as a function of the predetermined plurality of lines NL acquired at the acquisition rate V_det, in turn defined as a function of the selectable speed V_sel.

In a preferred embodiment of the invention, V_det is represented by a pulse train signal.

According to the invention, the acquisition rate V_det represented by a pulse train signal is synchronous with the signal representative of the selectable speed V_sel.

The processing unit 6 comprises a locating module 65 configured to receive, as input, the plurality of representative points Pi and calculate location coordinates Xi″,Yi″,αi″ of the printing substrate 1 relative to the first predefined reference Ref as a function of the plurality of representative points Pi.

According to the invention, the calculation is made by interpolation of the representative points Pi.

According to the invention, the representative points Pi of the printing substrate 1 are positioned on edges of the substrate 1, preferably on the horizontal and vertical edges of the printing substrate.

In other words, the locating module 65 is configured to analyse, by means of artificial vision algorithms, the generated primary image I_PR and to detect the vertex position and angle that the incoming printing substrate forms relative to the reference system.

In particular, scanning of the image takes place in the direction of motion Dir of the conveyor surface 5, synchronously with the pulse train generated as a function of the selectable speed V_sel.

Preferably, the framed area is about 130×130 mm, more preferably it is about 100×100 mm and can be set based on the format of the printing substrate.

The printing substrate is considered like a two-dimensional rectangle, the thickness being negligible compared to the other dimensions; the framed area contains one of the corners of the substrate, generally the top left or right corner. The side must appear with a minimal background edge in order that the vertex can be correctly detected.

A composition of successive readings of the representative points Pi enables the determination of the location coordinates Xi″,Yi″,αi″ of the printing substrate 1 relative to the predefined reference Ref.

In a preferred embodiment of the invention, the first predefined reference Ref is the reference system of the second acquisition means 3, consisting, in particular, of a camera.

Figure 4:
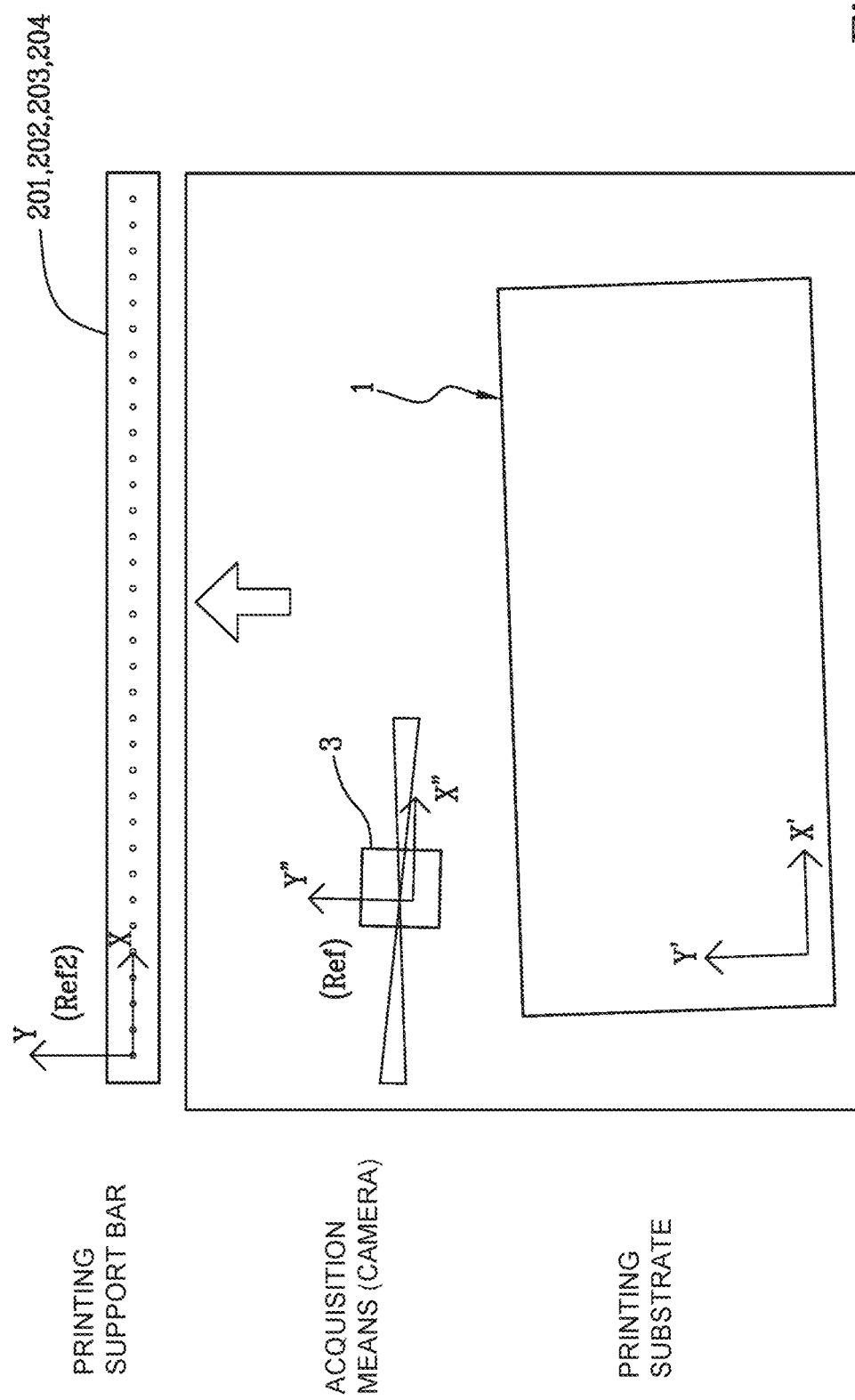
FIG. 4 is a diagram comparing between reference systems.
Figure 5:
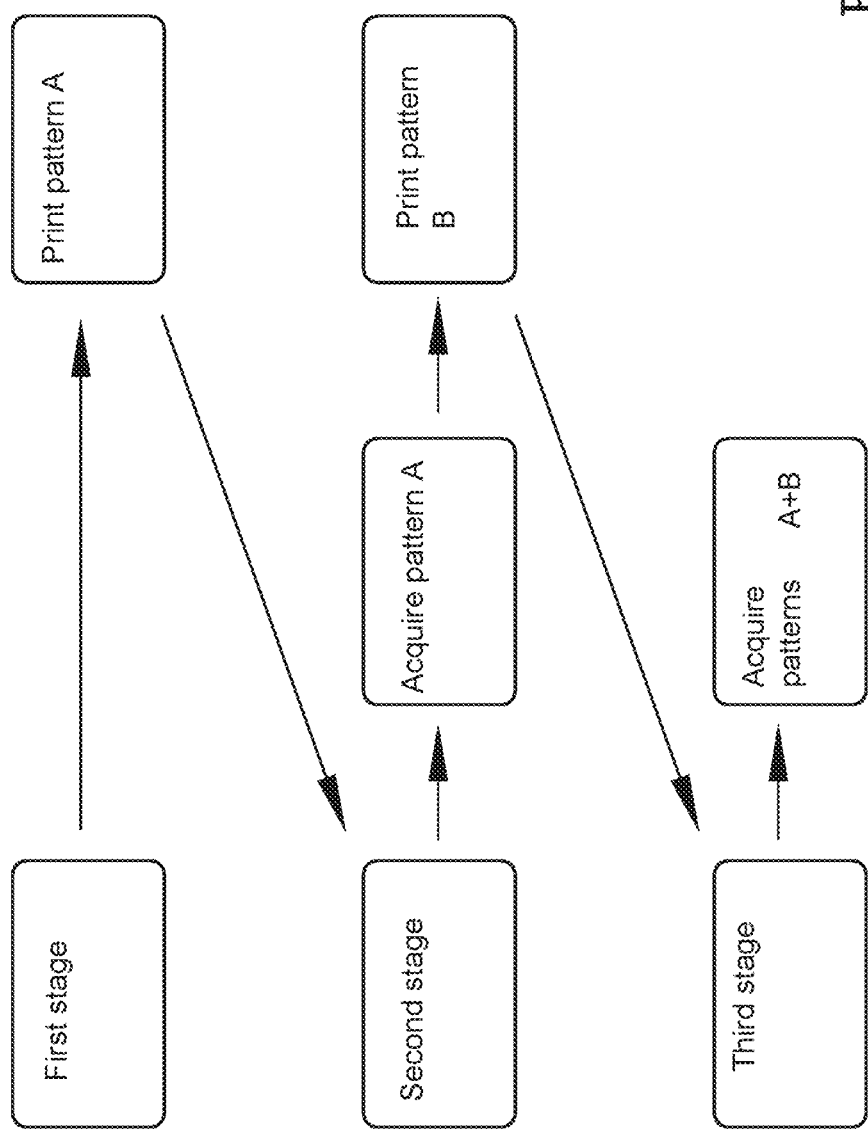
FIG. 5 is a logic diagram of a step of the method of the invention.

The reference system Ref is shown in FIG. 4 together with the other reference systems which will be described below.

Figure 3:
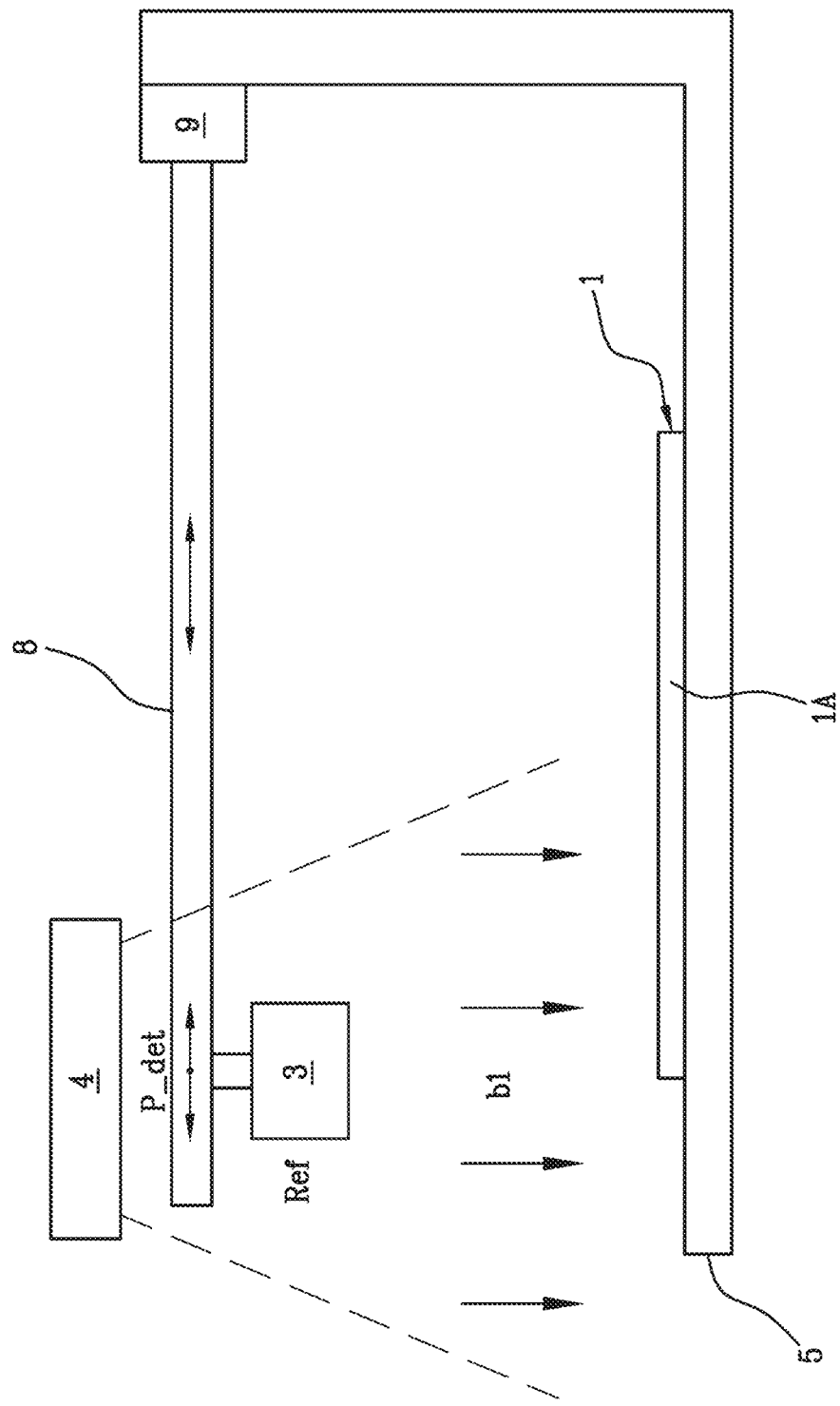
FIG. 3 is a side view of an embodiment of the device for locating a printing substrate according to the invention.

With reference to FIG. 3, according to the invention, the second acquisition means 3 and the illumination means 4 are positioned on a linear guide 8 moved by a movement means 9, in particular a high-precision motor.

The technical effect achieved is the positioning, with absolute repeatability, of the acquisition means 3 in proximity to the working position, i.e. in proximity to an acquisition point P_det of the predetermined plurality of lines NL.

The resulting advantage is the possibility of managing printing substrate formats that are very different from one another; in these cases, in fact, once the format is detected, the invention envisages that the acquisition point P_det of the predetermined plurality of lines NL is moved accordingly so that the images of the substrate of the detected format are correctly acquired.

In other words, with reference to FIG. 3, the locating device 100 comprises the linear guide (8), coupled to the second acquisition means 3, and configured to guide the second acquisition means 3, thereby identifying various points of acquisition Pdet of the predetermined plurality of lines NL.

In FIG. 3, the feed direction Dir of the conveyor surface 5 "exits" the sheet orthogonally, towards an observer, away from the plane in which the sheet lies; consequently, the printing substrate 1 moves in a direction of "exiting" the sheet, towards an observer, away from the plane in which the sheet lies.

The device further comprises the movement means 9 associated with the conveyor surface 5, and configured to move the linear guide 8 relative to the feed direction Dir.

According to the invention, the movement means 9 is configured to move the linear guide 8 substantially transversely relative to the feed direction Dir.

According to the invention, one or more of the second acquisition means 3 and the illumination means 4 are/is coupled to the linear guide 8 in such a way that a movement of the guide determines a variation in position of at least one between the second acquisition means 3 and the illumination means 4, relative to conveyor surface 5.

According to the invention, the first acquisition means 2 is configured to detect a format Fs of the printing substrate 1 moving on the conveyor surface 5 in the feed direction Dir.

The first acquisition means 2 is further configured to send to the processing unit 6 a format signal S_Fs representative of the detected format Fs (FIGS. 1 and 2).

The processing unit 6 comprises a movement module 64 configured to receive the format signal S_Fs and activate the movement means 9 in such a way as to vary the position of at least one between the second acquisition means 3 and the illumination means 4, relative to the feed direction Dir, as a function of the format signal S_Fs, thereby varying the points of acquisition Pdet of the predetermined plurality of lines NL.

Preferably, the movement module 64 is configured to activate the movement means 9 in such a way as to vary the position of at least one between the second acquisition means 3 and the illumination means 4, substantially transversely relative to the feed direction Dir, as a function of the format signal S_Fs, thereby varying the points of acquisition Pdet of the predetermined plurality of lines NL.

The technical effect achieved is a rapid, precise identification of the dimensions of the printing substrate and of the corresponding optimal acquisition point Pdet for the acquisition of the corresponding predetermined plurality of lines NL.

The device described thus far makes it possible to achieve the functionality of a corresponding method of locating a printing substrate 1 moving on a conveyor surface 5, wherein the method comprises the steps of:

providing the printing substrate 1 moving on a conveyor surface 5 at a selectable speed V_sel and in a feed direction Dir;

acquiring a predetermined plurality of lines NL of the printing substrate 1 in movement, as a function of a line frequency FL defined, in turn, as a function of an acquisition rate V_det;

generating a primary image I_PR as a function of the acquired predetermined plurality of lines NL;

detecting, from the generated primary image I_PR, a plurality of representative points Pi of the printing substrate 1, wherein the coordinates of the plurality of points Pi are expressed in relation to a first predefined reference Ref;

calculating location coordinates Xi",Yi",αi" of the printing substrate 1 relative to the first predefined reference Ref, as a function of the plurality of representative points Pi.

According to the invention, the step of acquiring the predetermined plurality of lines NL is performed based on the reception of a Start activation signal.

According to the invention, the step of generating the primary image I_PR as a function of the acquired predetermined plurality of lines NL is performed at the acquisition rate V_det defined as a function of the selectable speed V_sel.

In particular, the acquisition rate V_det is represented by a pulse train signal synchronous with the signal representative of the selectable speed V_sel.

A composition of successive readings of the representative points Pi enables the determination of the location coordinates Xi",Yi",αi" of the printing substrate 1 relative to the predefined reference Ref.

According to the invention, the representative points Pi of the printing substrate 1 are positioned on the edges of the substrate 1, preferably on the horizontal and vertical edges of the printing substrate.

According to the invention, the first predefined reference Ref is the reference system of the second acquisition means 3, consisting in particular of a camera.

Other steps of the method coincide with the functions of the operating modules of the processing unit 6 or of the components of the above-described locating device 100 and they perform other steps of the method depending on the ones illustrated.

The invention also comprises a method of digital printing on printing substrates which, among the steps provided for, also comprises the location of a printing substrate 1 as achieved by the method just described.

The invention also comprises a corresponding system for digital printing on printing substrates which comprises the locating device 100

The invention envisages providing at least one printing substrate 1; for the sake of simplicity, reference will be made to a single substrate in the course of the discussion.

With reference to FIG. 1, the invention in fact comprises the conveyor surface 5 configured to convey at least one printing substrate 1 towards a printing apparatus 200 at a selectable speed V_sel and in a predefined direction Dir.

For the sake of simplicity, reference will be made hereinafter to one printing substrate 1, though this is not intended to mean that only a single substrate can be conveyed at a time.

In particular, the invention comprises feeding, with a random orientation, the printing substrate 1 towards the printing apparatus 200 on the conveyor surface 5, at a selectable speed V_sel and in the predefined direction Dir;

The invention comprises providing a digital image I_dgt to be printed on the printing substrate 1.

To this end, the printing system of the invention comprises an insertion interface 300 (FIG. 1) configured to receive the digital image I_dgt to be printed on the printing substrate 1.

The printing apparatus 200 comprises at least one printing support bar 201,202,203,204 which supports a plurality of print heads 201i,202i,203i,204i, configured to print the digital image I_dgt on the at least one printing substrate 1.

The invention further comprises locating the printing substrate 1 infed to the printing apparatus 200 on the conveyor surface 5, thereby determining location coordinates Xi",Yi",αi" of the printing substrate 1 relative to the first predefined reference Ref.

This step is implemented by means of the locating device 100.

The locating device and method were described previously.

In order to print an image correctly on the printing substrate, it is necessary to perform an alignment between the substrate and the image. According to the prior art, the alignment can be achieved by acting on the printing substrate, moving it physically (e.g. by means of the guide). According to the invention, the alignment is achieved by acting on the image and modifying it via software.

The technical effect achieved is to render the printing process independent of the position of the substrates infed to the printing apparatus, for example in order to limit mechanical intervention and reduce the number of necessary parts.

If the substrates were always correctly oriented, it would suffice to apply a transversal translation of the image relative to the printing bar, according to the position of the substrates on the conveyor surface.

However, the substrates not being correctly oriented, it is necessary to know the angle of entry into the machine, which corresponds to the rotation angle to be applied to the image.

The locating device previously described thus serves to calculate this angle as well, in addition to the position of the vertex.

In the case of rectangular (and square) shaped tiles, which are symmetrical if rotated by 180°, it is possible to limit the range of the angle from −90° to +90°.

In other words, the invention makes it possible to locate the printing substrate 1 infed to the printing apparatus 200 on the conveyor surface 5, thereby determining location coordinates Xi",Yi",αi" of the printing substrate 1 relative to the first predefined reference Ref.

More precisely, the coordinates Xi",Yi" represent the vertex of the printing substrate 1 relative to the first predefined reference Ref, whilst αi is the angle of entry of the printing medium into the machine which corresponds to the angle of rotation to be applied to the image.

The invention further comprises rotating the digital image I_dgt as a function of the positioning coordinates Xi",Yi", αi" of the printing substrate 1, thereby determining a rotated digital print image I_dgt_r_Print for the printing substrate 1.

To this end, the printing system of the invention comprises the processing unit 6, in data connection with the printing apparatus 200 and with the locating device 100.

The processing unit 6 comprises a rotation module 67 configured to rotate the digital image I_dgt as a function of the positioning coordinates Xi",Yi",αi" of the printing substrate 1, thereby determining a rotated digital print image I_dgt_r_Print for the printing substrate 1; In order to rotate the digital image I_dgt, the invention comprises a computer-implemented rotation method.

The method for rotating a digital image I_dgt generates a print of a corresponding rotated print image I_dgt_r_Print on at least one printing substrate 1.

Figure 9:
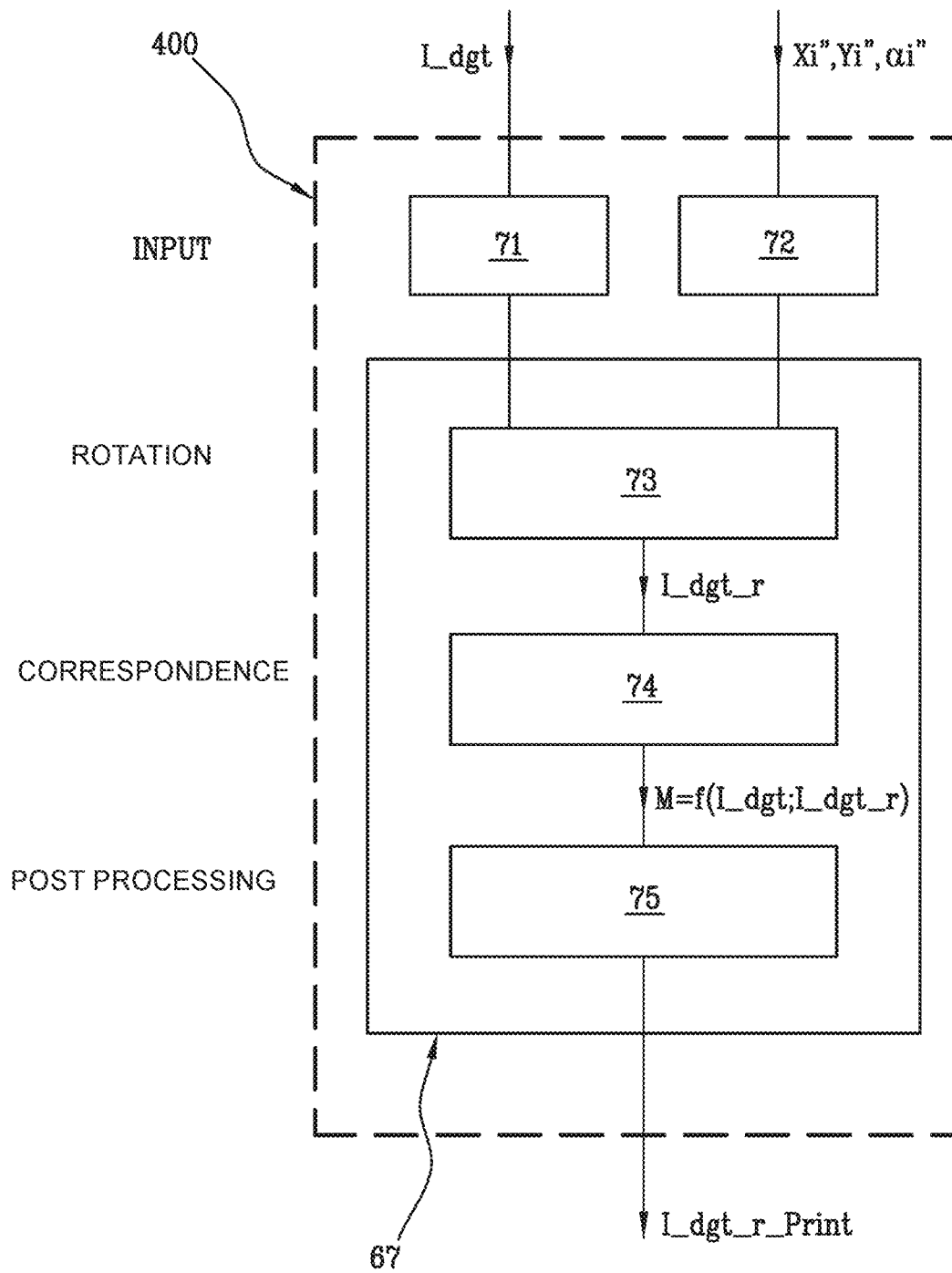
FIG. 9 is a block diagram of a device/method for rotating an image for a printing substrate, according to the invention.

With reference to FIGS. 9 and 2, the invention comprises a step of inputting data which prepares the digital image I_dgt to be printed on the at least one printing substrate 1 and receives positioning coordinates Xi",Yi",αi" of the printing substrate 1 relative to a first predefined reference Ref. For these purposes, with reference to FIG. 9, the processing unit 6 comprises a first receiver module 71 configured to receive a digital image I_dgt to be printed on the at least one printing substrate 1.

The processing unit 6 further comprises a second receiver module 72 configured to receive the positioning coordinates Xi",Yi",αi" of the printing substrate 1 relative to a first predefined reference Ref.

The invention comprises rotating the image I_dgt relative to its centre as a function of the positioning coordinates Xi",Yi",αi", thus determining a rotated image I_dgt_r.

Stated in other terms, the processing unit 6 comprises the rotation module 67 configured to digitally rotate the image I_dgt relative to its centre as a function of the positioning coordinates Xi",Yi",αi", thus determining a rotated image I_dgt_r.

According to the invention, the step of rotating the image I_dgt relative to its centre as a function of the positioning coordinates Xi",Yi",αi", comprises the steps of:
  applying a first translation T1 consisting in translating the image I_dgt in such a way that the centre of the image coincides with the origin of a reference rotation system;
  rotating the image relative to its centre;
  applying a second translation T2 by translating the rotated image I_dgt_r in such a way that the pixel at the top right coincides with the origin of the reference rotation system.

In other words, the invention comprises roto-translating the digital image of the printing substrate.

The rotation is performed by means of a technique of mapping between pixels Px_r_ij of the rotated image I_dgt_r and pixels Px_ij of the digital image I_dgt.

The invention comprises calculating a matrix of correspondences M between the pixels Px_r_ij of the rotated image I_dgt_r and the pixels Px_ij of the digital image I_dgt, wherein the matrix is configured to indicate how many pixels Px_r_ij of the rotated image I_dgt_r correspond to pixels Px_ij of the digital image I_dgt; in other words, M=f(I_dgt;I_dgt_r).

For this purpose, a first calculation module 74 is configured to calculate a matrix of correspondences M between the pixels Px_r_ij of the rotated image I_dgt_r and the pixels Px_ij of the digital image I_dgt, wherein the matrix is configured to indicate how many pixels Px_r_ij of the rotated image I_dgt_r correspond to pixels Px_ij of the digital image I_dgt.

There exist various mapping techniques in the literature, such as forward mapping and backward mapping.

In the former, however, it is possible that in the rotated image there may be so-called "holes" and "folds", i.e. pixels that have not been mapped and pixels that have been mapped several times, whose number, in the case of rotation, will depend on the angle.

For this reason, in general the transformations that use a forward mapping strategy are not objective.

In order to obtain an image formed by pixels mapped once and only once, it is necessary to use the reverse strategy, called backward mapping, that is, to associate a pixel of the original image with every pixel of the rotated image, which corresponds to applying a rotation of the same angle to the rotated image, but in the opposite direction.

The problem is only partially resolved, however, since the approximation to be applied in backward mapping determines the presence of "holes" and "folds", this time in the original image.

In other words, some pixels of the original image are not mapped in pixels of the rotated image and consequently others are mapped more than once.

By analysing the distribution of correspondences, in particular with the calculated matrix of correspondences M, it has been seen that a pixel can be mapped twice at most and the maximum number of pixels mapped twice occurs with an angle of ±45°.

The incongruence with the original image due to the fact that there is not 1:1 mapping has repercussions on the rotated image, which proves to be of inferior quality compared to the original.

In the field of the invention, the depth of colour of the images is limited to 4 levels because only 2 bits are used for each channel (if not indeed images with only two levels, with one bit per pixel).

Interpolation between pixels that can take on only 4 (2) different values does not give good results, as it introduces graphically inacceptable artefacts.

There is also a variation in tone. In fact, in order to represent intermediate tones between the 4 levels used, one acts on the distribution of the points in the image. This distribution is performed by means of stochastic and error diffusion methods. When the image is rotated, it is necessary to preserve the stochastic distribution of the points in order not to alter the tone of the graphics.

In order to enhance the quality of the resulting image and the efficiency of the algorithm, it was thus decided to use the simplest method of interpolation, namely, the nearest neighbour method, which consists in approximating to the nearest pixels; this can be achieved by rounding the values of the coordinates.

Conventional mapping and interpolation thus do not give an optimal result in terms of image quality and efficiency of the rotation. A post-processing is thus necessary.

According to the invention, and with reference to FIG. 10, the post-processing step comprises the steps of:
  detecting, from the matrix of correspondences M, the pixels of the digital image I_dgt that have no correspondence Px_33 with the pixels Px_r_ij of the rotated image I_dgt_r;
  detecting the pixels with multiple correspondences (Px_r_32,Px_r_33) in the rotated image I_dgt_r;
  remapping the pixels Px_33 with no correspondence in the digital image I_dgt in respective pixels with multiple correspondences Px_r_32,Px_r_33 in the rotated image I_dgt_r;

According to the invention, the remapping step determines the rotated digital print image I_dgt_r_Print having a preserved distribution of pixels relative to the digital image I_dgt.

In particular, the post-processing step can be implemented in the device 400 by means of a second calculation module 75.

The technical effect achieved is to preserve the stochastic distribution in which all the points have been included only once.

In other words, performing a post-processing by means of a matrix of correspondences M, containing, for every pixel of the original image, the coordinates of the pixels of the rotated image in which the original image was mapped, means returning to the source image by considering the pixels of the target image which correspond to pixels in the source image and considering, in the return to the source image, that use can be made of a nearest neighbour-type interpolation directed at the pixels near the pixel considered.

In other words, in order to enhance the quality of the resulting image and the efficiency of the algorithm, use has been made of the simplest interpolation method, namely, the nearest neighbour method, which consists in approximating to the nearest pixels; this can be achieved by rounding the values of the coordinates.

The technical effect achieved is to preserve the stochastic distribution in which all the points have been included only once.

With reference to FIG. 10, according to the invention, the step of remapping the pixels Px_33 with no correspondence in the digital image I_dgt in respective pixels with multiple correspondences Px_r_32,Px_r_33 in the rotated image I_dgt_r comprises the steps of:

detecting, among the pixels near, for example the ones adjacent to, the pixel with no correspondence Px_33 in the digital image I_dgt, whether there exists a pixel Px_32 that has a multiple correspondence with pixels Px_r_32 and Px_r_33 of the rotated image I_dgt_r;

and whether there exists a pixel Px_32 in the digital image I_dgt having a multiple correspondence with pixels Px_r_32 and Px_r_33 of the rotated image I_dgt_r, and copying, in one of the pixels Px_r_32 and Px_r_33 having a multiple correspondence, the identifier of the pixel Px_33 of the digital image I_dgt that has no correspondence with the pixel Px_r_ij of the rotated image I_dgt_r.

Advantageously, the step of copying, in one of the pixels Px_r_32 and Px_r_33 having a multiple correspondence, the identifier of the pixel Px_33 of the digital image I_dgt that has no correspondence with the pixel Px_r_ij of the rotated image I_dgt_r comprises the steps of: if, in the original image, the pixel to be remapped (with zero correspondences) Px_33 is nearer to/farther from the origin O(X,Y) relative to the one mapped twice Px_32, copying, in the pixels Px_r_32 nearer to/Px_r_33 farther from the rotated origin O (Xr;Yr), the pixels Px_33 of the digital image I_dgt to be remapped.

The technical effect achieved by this last stage is to preserve the right stochastic distribution of all the points in the rotated image.

In other words, the two coordinates found (Px_r_32 and Px_r_33) correspond to two possible targets. The choice of one or the other is performed in such a way as to preserve the distribution of the pixels of the original image in the rotated one, based on the distance of the pixels from the origin of the image: if, in the original image, the pixel to be remapped (with zero correspondences), is nearer to/farther from the origin than the one mapped twice (Px_32), the target pixel will be the one nearer to/farther from the rotated origin.

Preferably, the technique of mapping between pixels Px_r_ij of the rotated image I_dgt_r and pixels Px_ij of the digital image I_dgt is a backward mapping technique in which, starting from said rotated image I_dgt_r, one obtains said digital image I_dgt by rotating said rotated image I_dgt_r relative to the centre of the rotated image itself.

Preferably, the step of detecting, among the pixels near the pixel with no correspondence Px_33 in the digital image I_dgt, whether there exists a pixel Px_32 that has a multiple correspondence with pixels Px_r_32 and Px_r_33 of the rotated image I_dgt_r, is performed by means of a nearest neighbour technique.

As noted above, the post-processing step can be implemented in the device 400 by means of a second calculation module 75, as shown in FIG. 10.

The second calculation module 75 is configured, in the step of remapping the pixel Px_33 with no correspondence in the digital image I_dgt in respective pixels with multiple correspondences Px_r_32,Px_r_33 in the rotated image I_dgt_r, to:

detect, among the pixels near (for example the ones adjacent to) the pixels with no correspondence Px_33 in the digital image I_dgt), whether there exists a pixel Px_32 that has a multiple correspondence with the pixels Px_r_32 and Px_r_33 of the rotated image I_dgt_r; and whether there exists a pixel Px_32 in the digital image I_dgt having a multiple correspondence with the pixels Px_r_32 and Px_r_33 of the rotated image I_dgt_r, and to copy, in one of the pixels Px_r_32 and Px_r_33 having a multiple correspondence, the identifier of the pixel Px_33 of the digital image I_dgt that has no correspondence with the pixel Px_r_ij of the rotated image I_dgt_r.

The second calculation module 75 is further configured, in the step of copying, in one of the pixels Px_r_32 and Px_r_33 having a multiple correspondence, the identifier of the pixel Px_33 of the digital image I_dgt that has no correspondence with the pixel Px_r_ij of the rotated image I_dgt_r, to perform the step of:

if, in the original image, the pixel to be remapped (with zero correspondences) Px_33 is nearer to/farther from the origin O(X,Y) relative to the one mapped twice Px_32, copying, in the pixels Px_r_32 nearer to/Px_r_33 farther from the rotated origin O (Xr;Yr), the pixel Px_33 of the digital image I_dgt to be remapped.

More in general, the calculation module 75 is configured to perform all the processing functions on the pixels described in reference to the post-processing step described in the method.

At the end of the step of rotating the image to be printed on the substrate 1, the image I_dgt_r_Print is ready to be printed with the right orientation on the printing substrate 1 infed to the printing apparatus 200.

In a preferred embodiment of the invention, the printing operation is performed by the plurality of print heads 201i,202i,203i,204i mounted on at least one printing support bar 201,202,203,204 in a predetermined and fixed position.

In a second embodiment, the invention further comprises translating the at least one printing support bar 201,202,203, 204 in the predefined direction Dir at a translation speed V_tr synchronised with the selectable speed V_sel in such a way that the at least one printing support bar 201,202,203, 204 follows the movement of the printing substrate 1.

In other words, the processing unit 6 comprises the first processing module 63 configured to receive, as input, the selectable speed V_sel and to generate a translation speed command S_V_tr configured to command a translation of the at least one printing support bar 201,202,203,204 along the predefined direction Dir at a translation speed V_tr.

According to the second embodiment of the invention, the translation speed V_tr is synchronised with the selectable speed V_sel of the printing substrate 1.

In particular, the translation speed V_tr coincides with the selectable speed V_sel of the printing substrate 1.

In the preferred embodiment, the invention comprises printing the rotated print image I_dgt_r on the printing substrate 1, maintaining the orientation of the printing substrate 1 unchanged relative to a second predefined reference Ref2.

In the preferred embodiment, the invention comprises printing the roto-translated print image I_dgt_T_Print on the printing substrate 1, maintaining the orientation of the printing substrate 1 unchanged relative to a second predefined reference Ref2.

The second predefined reference Ref2 is the reference of the at least one printing support bar.

In the second embodiment of the invention, the printing operation is performed by the plurality of print heads 201i,202i,203i,204i during the translation of the at least one printing support bar (201,202,203,204).

In other words, the printing substrate 1 moves at a speed V_sel when infed to the printing apparatus 200 and the at least one printing support bar 201,202,203,204 translates at a speed V_tr which coincides with the speed V_sel.

A communication module 66 in the processing unit 6 is configured to transmit the translation speed command S_V_tr and the rotated print image I_dgt_r_Print to the at least one printing support bar 201,202,203,204.

The plurality of print heads 201i,202i,203i,204i is configured to print the digital image I_dgt_r_Print on the at least one printing substrate 1 moving at the selectable speed V_sel along the predefined direction Dir.

In the second embodiment, the printing operation is performed while the print heads 201i,202i,203i,204i translate along the predefined direction Dir at a translation speed V_tr synchronised, in particular coinciding, with the selectable speed V_sel.

Summing up, the method/printing system of the invention thus enables the locating device 100 for locating the printing substrates to "dialogue" with the printing apparatus 200.

However, since the reference systems of the locating device 100 and of the printing apparatus 200 are different, it is important to "calibrate" the printing system in its entirety in order to make a coherent interaction between the aforesaid device and the aforesaid apparatus possible.

For this purpose, the processing unit 6 comprises a calibration module 68 associated with the locating module 65.

The calibration module 68 is configured to receive the location coordinates Xi",Yi",αi" and make them coherent with the second reference system Ref2.

The calibration is performed prior to the operation of rotating the image to be printed.

Preferably, the calibration operation is performed at the start-up of the system configured to operate with a specific type of printing substrates 1, i.e. with substrates for printing a predefined size; upon a change in the dimensions of the printing substrates, the system will require a new calibration.

The purpose of the calibration is therefore to align the first predefined reference Ref with the second predefined reference Ref2.

In a preferred embodiment of the invention, in the locating device 100, the first predefined reference Ref is the reference system of the second acquisition means 3, in particular of the camera.

In a preferred embodiment of the invention, in the printing apparatus 200, the second predefined reference Ref2 is the reference system of one of the printing support bars 201, 202,203,204.

In an alternative embodiment of the invention, in the printing apparatus 200, the second predefined reference Ref2 is the reference system of a plurality of printing support bars 201,202,203,204.

According to the invention, the aligning step comprises a first sub-step of feeding a printing substrate 1 with a random orientation on the conveyor surface 5 in the direction of movement Dir towards the printing apparatus 200, and the printing apparatus 200 prints a first pattern A on the printing substrate 1 with the at least one printing support bar 201, 202,203,204 in a fixed position in the second predefined reference Ref2, thus also maintaining the print heads 201i, 202i,203i,204i in a fixed position.

In other words, once a printing substrate 1 has been fed towards the printing apparatus 200, the first sub-step enables a first pattern to be printed on the printing substrate 1.

Preferably, the printing step is preceded by detecting the reference system of the at least one printing support bar Ref2.

According to the invention, the aligning step comprises a second sub-step of again feeding the printing substrate 1 on the conveyor surface 5 in the direction of movement Dir towards the apparatus 200, locating the first pattern A by means of the locating device 100 and printing a second pattern B on the printing substrate 1.

In other words, after the printing substrate 1 has again been fed towards the printing apparatus 200, the second sub-step enables the first pattern A to be located and a second pattern B to be printed on the printing substrate.

According to the invention, the aligning step comprises a third sub-step of again feeding the printing substrate 1 on the conveyor surface 5 in said direction of movement Dir towards the apparatus 200 and locating the first pattern A and the second pattern B by means of the locating device 100. In other words, the third sub-step enables the first pattern A and the second pattern B to be located.

According to the invention, the aligning step comprises a step of determining a matrix of roto-translation M between the two patterns A, B, thereby determining a matrix of roto-translation between the first reference Ref and the second reference Ref2.

The technical effect achieved is that the alternation of sub-steps of printing known patterns and the subsequent acquisition/location thereof enables a 3×3 perspective transformation matrix (translation, rotation, scale, perspective) to be obtained between the location system (first predefined reference system Ref) and the single (or multiple) printing bar(s) (second predefined reference Ref2).

Another technical effect achieved is that, given that the "calibration" process is repeated for each printing bar (of a different colour), one obtains the calibration of each bar with the location system and, because of the transitive property, each print head is calibrated with the others. This effect makes it possible to avoid mechanically aligning the print heads in a micrometric manner.

The effect of this approach is that any mechanical misalignment will be compensated for by the electronic calibration.

Going into greater detail, the calibration module receives, as input, a series of images of the printing substrate 1 acquired/located by the locating device and outputs a table of calibration values that are saved in the product database.

In the preferred embodiment of the invention, we can consider that in the system for digital printing on printing substrates, three reference systems are present:

first reference system Ref of the second acquisition means 3 (x",y"), in particular a camera;

second reference system Ref2 of the at least one printing support bar (x,y);

third reference system of the printing substrate (x',y').

Figure 6:
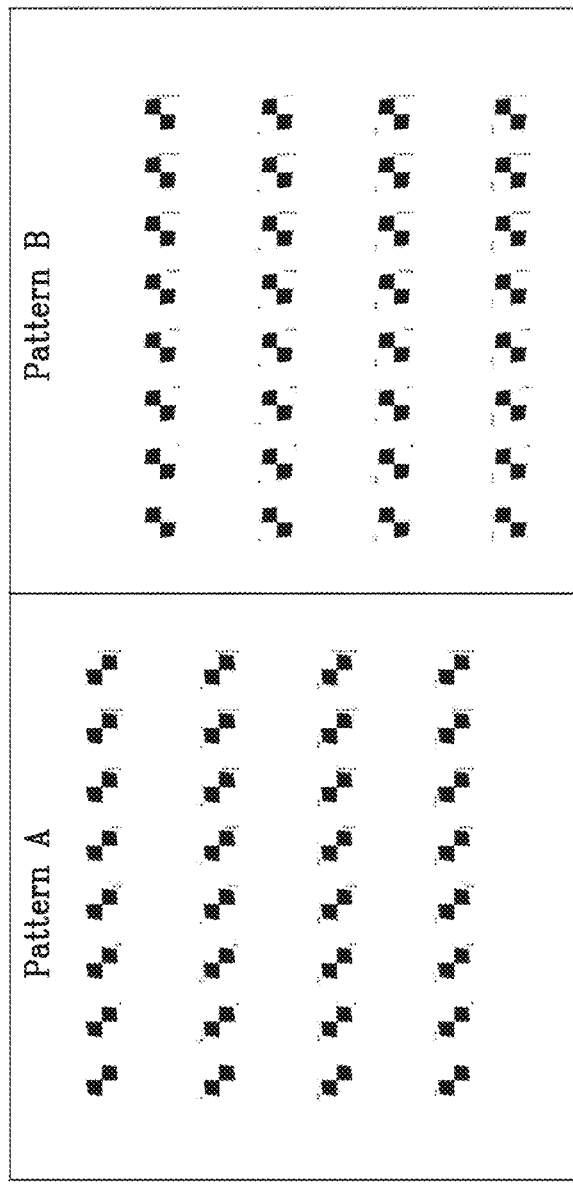
FIG. 6 is a logic diagram of a detail of the step of the method of the invention shown in FIG. 5.
Figure 7:
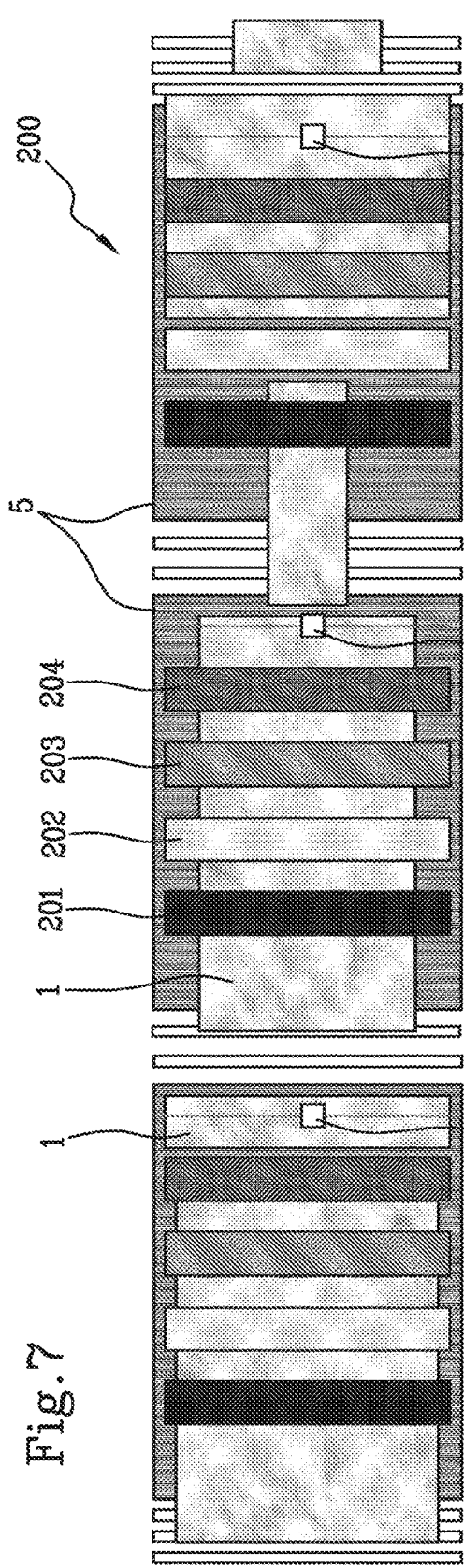
FIG. 7 is a top schematic view of a printing system of the invention, comprising a plurality of printing stations, and positioned downstream of the locating device of FIG. 1.
Figure 8:
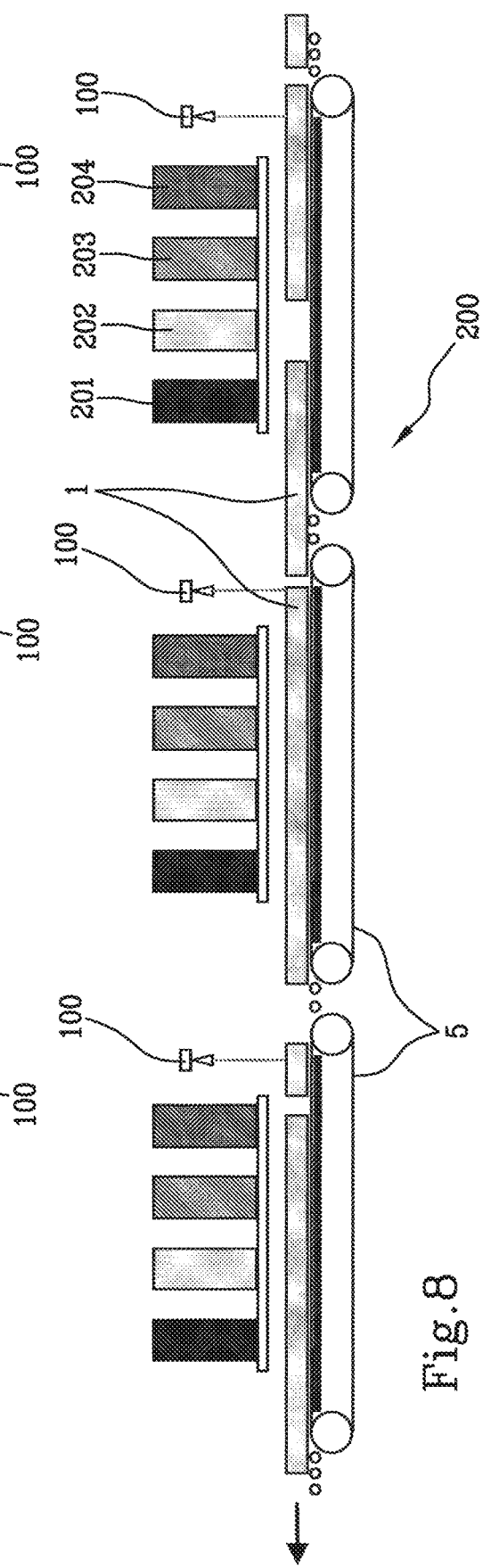
FIG. 8 is a schematic side view of the printing system of FIG. 7.

With reference to FIG. 6, for a correct calibration of the system, the two patterns indicated by the letters A and B are used. The patterns have the appearance of a matrix of markers easily locatable by the vision software. Each marker is characterised by a direction and a row and column number that serves to identify it.

The patterns are generated according to the size and resolution of the printing apparatus: in width they contain a number of points equal to the number of nozzles. They are in fact integral with the reference system of the printing support bar.

The calibration process will now be described in detail.
1. In the first stage of the calibration process, in order to align different reference systems (for example the first predefined reference Ref and the second predefined reference Ref2) the pattern A is printed on the calibration tile.

It is assumed that the tile has entered the system in a random position and that the print heads remain on a fixed reference system:

(x1', y1') tile reference system at the first stage;

(x, y) printing support bar reference system;

2. In the second stage, the tile is fed back in and scanned by the camera, processed by the calibration software module and a position and number are obtained for every marker.

Furthermore, maintaining the position, it is printed with the pattern B. Let us consider:

(x2', y2')≠(x1', y1') tile reference system at stage 2

(x", y") camera reference system (x, y) printing bar reference system

3. In the third stage the tile is fed back in and scanned a second time.

It is processed by the calibration software module, and a position and identification number are obtained for every marker, repeating the operation for the markers of both pattern A and pattern B. The two patterns are easily distinguishable, as they are asymmetrical.

Let us consider:

(x3', y3')≠(x2', y2')≠(x1', y1') tile reference system at stage 3;

(x", y") camera reference system;

Considering, for the sake of simplicity, a single marker of the pattern B, let us consider:

Pb position of marker B in the printing bar reference system (x,y) (known a priori);

Pb3" position of marker B in the camera reference system (x", y") (derived by the analysis software) at stage 3.

Having moved the tile between stages 2 and 3, the correct relation is given by Pb=F(Pb3")+G((x3', y3')−(x2', y2')), where the second addend considers the variation the tile reference system has undergone between stage 3 and stage 2.

In other words, the second addend represents the transformation coefficient for bringing the tile reference system of stage 3 to stage 2.

In order to evaluate this second transfer function, let us consider the same marker of pattern A at stage 2 and at stage 3.

Given that the camera reference system has not changed, we can consider:

P2" position of marker A in the camera reference system (x", y") at stage 2.

P2' position of marker A in the tile reference system (x2', y2') at stage 2.

P3" position of marker A in the camera reference system (x", y") at stage 3.

P1' position of marker A in the tile reference system (x3', y3') at stage 3. Given that the position of the marker in the camera reference system has not changed between stage 2 and stage 3, we can affirm that:

P2'=G2

(P2")=P3'=G3 (P3")

P3"=G3G2 (P2")

This function represents the point variation taking place between stage 2 and stage 3.

The final formula can thus be summed up with: P=F(P3")+G(P2").

By applying this formula to all the positions P of the markers and ordering them, we obtain a relation: [P . . . Pn]=M [P" . . . Pn"]

From which, through the solution of the problem, we obtain a matrix M of dimensions [3×3] containing the coefficients of the linear transformation from the camera reference system to the bar reference system.

In conclusion, the invention enables a precise rotation of an image for a printing substrate by enabling precise and reliable processing of the data related to the printing substrate and the image itself.

Providing, in accordance with the invention, a precise rotation of images for printing substrates which ensures a precise positioning of images to be printed on printing substrates, in particular a positioning on printing substrates at the entry of a printing apparatus, enables an optimisation of the subsequent control and printing steps, ensuring a more efficient and flexible printing system/method.

In particular, the invention, as described, achieves the following technical effects, as compared to the prior art:

precise and reliable processing of the data related to the printing substrate and to the image itself due to the precise rotation of the image; in other words, given the high reliability of the image rotation process, the image can be intended for very complex printing requiring high precision.

less risk of damaging the printing substrates due to the lack of any need to rotate them mechanically in order to correct their orientation;

less risk of damaging the printing substrates because no passage between guides is necessary to maintain the orientation of the substrates, nor is there any contact with guides;

lack of any need to have incoming substrates oriented in an optimal manner, which makes it possible to considerably reduce the time of providing the printing substrates and printing times;

separability of the stations making up the system, which ensures the possibility of having several stations of the system work in parallel or remotely, with the following advantages:

possibility of using stations made by different manufacturers in a same system, thus enabling a synchronisation thereof and making the structuring of the system as "modular" as possible;

production efficiency, by virtue of the fact that production times are no longer dependent on the sum of the times of stations arranged in series in the system and separable neither physically, nor in terms of sequential timing;

more efficient maintenance, by virtue of the fact that one station can undergo inspection without blocking the others;

a better reaction to malfunctions, by virtue of the fact that a malfunction in one station will not block the entire system, as the station can be momentarily replaced by another similar one.

The invention claimed is:

1. A computer-implemented method for rotating a digital image for printing a corresponding rotated digital print image on at least one printing substrate, the method comprising:
   (a) providing a digital image to be printed on a printing substrate;
   (b) receiving positioning coordinates of said printing substrate relative to a first predefined reference;
   (c) rotating said digital image relative to its centre as a function of said positioning coordinates, thus determining a rotated image;
      wherein said rotation is performed by means of a technique of mapping between a plurality of pixels of the rotated image and a plurality of pixels of the digital image;
   (d) calculating a matrix of correspondences between said plurality of pixels of the rotated image and said plurality of pixels of the digital image, wherein the matrix is configured to indicate how many of said plurality of pixels of the rotated image correspond to how many of said plurality of pixels of the digital image; and
   (e) performing a post-processing, comprising:
      i) detecting, from said matrix of correspondences, a plurality of pixels of the digital image that have no correspondence with a plurality of pixels of the rotated image;
      ii) detecting a plurality of multiple pixels in said rotated image; and
      iii) remapping the plurality of pixels of the digital image that have no correspondence with the plurality of pixels of the digital image, into respective pixels with multiple correspondences in the rotated image;
         wherein the remapping step determines a rotated digital print image having a preserved distribution of pixels relative to said digital image.

2. The method according to claim 1, wherein step (e) iii) comprises:
   α. detecting, among a plurality of pixels near the plurality of pixels that have no correspondence with the plurality of pixels of the digital image, when there exists a pixel that has a multiple correspondence with the plurality of multiple pixels of the rotated image;
   β. detecting when there exists a pixel in the digital image having a multiple correspondence with the plurality of multiple pixels of the rotated image, and
   γ. copying, in one of the pixels having a multiple correspondence with the plurality of multiple pixels of the rotated image, the identifier of a pixel of the digital image that has no correspondence with a pixel of the rotated image.

3. The method according to claim 2, wherein step γ comprises: when, in the original image, a pixel of the plurality of pixels of the digital image that have no correspondence with the plurality of pixels of the digital image to be remapped, is nearer to an origin O (X,Y) relative to a pixel mapped twice, then copying in the pixels nearer to a rotated origin O(Xr;Yr), the pixels of the digital image to be remapped.

4. The method according to claim 2, wherein step β is performed by means of a nearest neighbour technique.

5. The method according to claim 2, wherein step γ comprises: when, in the original image, a pixel of the plurality of pixels of the digital image that have no correspondence with the plurality of pixels of the digital image to be remapped, is farther from an origin O (X,Y) relative to a pixel mapped twice, then copying in the pixels farther from a rotated origin O(Xr;Yr), the pixels of the digital image to be remapped.

6. The method according to claim 1 wherein said technique of mapping between the plurality of pixels of the rotated image and the plurality of pixels of the digital image is a backward mapping technique in which, starting from said rotated image, one obtains said digital image by rotating said rotated image relative to the centre of the rotated image itself.

7. The method according to claim 1, wherein said step (c) of rotating the digital image relative to its centre as a function of said positioning coordinates comprises:
   i) a applying a first translation translating the image in such a way that the centre of the image coincides with the origin of a reference rotation system;
   ii) rotating the image relative to its centre; and
   iii) applying a second translation by translating the rotated image in such a way that the pixel at the top right coincides with the origin of the reference rotation system.

8. A device for rotating a digital image for printing a corresponding rotated print image on at least one printing substrate, having a processing unit comprising:
   (a) a first receiver module configured to receive a digital image to be printed on said at least one printing substrate;
   (b) a second receiver module configured to receive positioning coordinates of said printing substrate relative to a first predefined reference; and
   (c) a rotation unit including:
      i) a rotation module configured to digitally rotate said image relative to its centre as a function of said positioning coordinates, thus determining a rotated image, wherein said rotation is performed by means of a technique of mapping between pixels of the rotated image and pixels of the digital image;
      ii) a first calculation module configured to calculate a matrix of correspondences between the pixels of the rotated image and the pixels of the digital image, wherein the matrix is configured to indicate how many pixels of the rotated image correspond to pixels of the digital image; and
      iii) a second calculation module configured to:
         α. detect, from said matrix of correspondences, the pixels of the digital image that have no correspondence with the pixels of the rotated image;
         β. detect, in said rotated image, the pixels with multiple correspondences;
         γ. remap the pixels with no correspondence in the digital image in respective pixels with multiple correspondences in the rotated image;
            wherein the remapping step determines said rotated digital print image characterised by a preserved distribution of pixels relative to said digital image.

9. The device according to claim 8, wherein said second calculation module, in step γ is configured to:
- α. detect, among the pixels near the pixel with no correspondence of the digital image, when there exists a pixel that has a multiple correspondence with pixels of the rotated image;
- β. detect when there exists a pixel in the digital image having a multiple correspondence with pixels of the rotated image, and
- γ. copy, in one of the pixels having a multiple correspondence, the identifier of the pixel of the digital image that has no correspondence with the pixel of the rotated image.

10. The device according to claim 9, wherein step γ is configured to perform the step of:
when, in the original image, a pixel of the plurality of pixels of the digital image that have no correspondence with the plurality of pixels of the digital image to be remapped is nearer to the origin O (X,Y) relative to the one mapped twice, then copying in the pixel nearer to the rotated origin O(Xr;Yr), the pixel of the digital image to be remapped.

11. The device according to claim 9, wherein step γ is configured to perform the step of:
when, in the original image, a pixel of the plurality of pixels of the digital image that have no correspondence with the plurality of pixels of the digital image to be remapped is farther from the origin O (X,Y) relative to the one mapped twice, then copying in the pixel farther from the rotated origin O(Xr;Yr), the pixel of the digital image to be remapped.

12. A method of digital printing on printing substrates, comprising:
- (a) providing at least one printing substrate;
- (b) providing a digital image to be printed on said at least one printing substrate;
- (c) providing a printing apparatus comprising at least one printing support bar which supports a plurality of print heads, configured to print said digital image on sale at least one printing substrate;
- (d) feeding, with a random orientation, said at least one printing substrate to said printing apparatus on a conveyor surface, at a selectable speed and in a predefined direction;
- (e) locating said at least one printing substrate infed to said printing apparatus on said conveyor surface, thereby determining location coordinates of said printing substrate relative to a first predefined reference;
- (f) rotating said digital image as a function of said positioning coordinates of said printing substrate, thereby determining a rotated digital print image for said printing substrate in accordance with claim 1, and
- (g) printing said rotated print image on said printing substrate, maintaining the orientation of said printing medium unchanged relative to a second predefined reference.

13. The method according to claim 12, comprising:
aligning the first predefined reference with the second predefined reference.

14. The method according to claim 13, wherein said aligning step comprises:
- (a) feeding a printing substrate towards said printing apparatus and printing a first pattern (A) on said printing substrate;
- (b) again feeding said printing substrate towards said printing apparatus, locating said first pattern (A) on said printing substrate, and printing a second pattern (B) on said printing substrate;
- (c) again feeding said printing substrate towards said printing apparatus, and locating the first pattern (A) and the second pattern (B); and
- (d) determining a matrix of roto-translation between patterns A and B, thereby determining a matrix of roto-translation between said first predefined reference and said second predefined reference.

15. The method according to claim 12, wherein said first predefined reference is the reference system of a second acquisition means.

16. The method according to claim 12, wherein said second predefined reference is either a reference system of a said printing support bar, or a reference system of a plurality of printing support bars.

17. The method according to claim 12 wherein the method is a computer implemented method.

18. A system for digital printing on printing substrates, comprising:
- (a) an insertion interface configured to receive a digital image to be printed on at least one printing substrate;
- (b) a conveyor surface configured to convey a printing substrate with a random orientation towards a printing apparatus at a selectable speed and in a predefined direction; said printing apparatus comprising at least one printing support bar which supports a plurality of print heads configured to print said digital image on said at least one printing substrate;
- (c) a locating device, positioned on an infeed side of said apparatus, and configured to locate said at least one printing substrate moving with a random orientation on said conveyor surface, according to claim 8, thereby determining location coordinates of said printing substrate relative to a first predefined reference; and
- (d) a processing unit, in data connection with said printing apparatus and with said locating device, comprising a rotation module configured to rotate said digital image as a function of said positioning coordinates of said printing substrate, thereby determining a rotated digital print image for said printing substrate,
  wherein said plurality of print heads is configured to print said digital image on said at least one printing substrate, maintaining the orientation of said printing medium unchanged relative to a second predefined reference.

19. The system according to claim 18, wherein said processing unit comprises an alignment module configured to align the first predefined reference with the second predefined reference.

20. The system according to claim 18, wherein said first predefined reference is a reference system of a second acquisition means.

21. The system according to claim 18, wherein said second predefined reference is either a reference system of a said printing support bar or a reference system of a plurality of printing support bars.

* * * * *